Jan. 15, 1952     T. P. FLYNN     2,582,538
TRENCHING PLOW
Filed July 19, 1947     2 SHEETS—SHEET 1
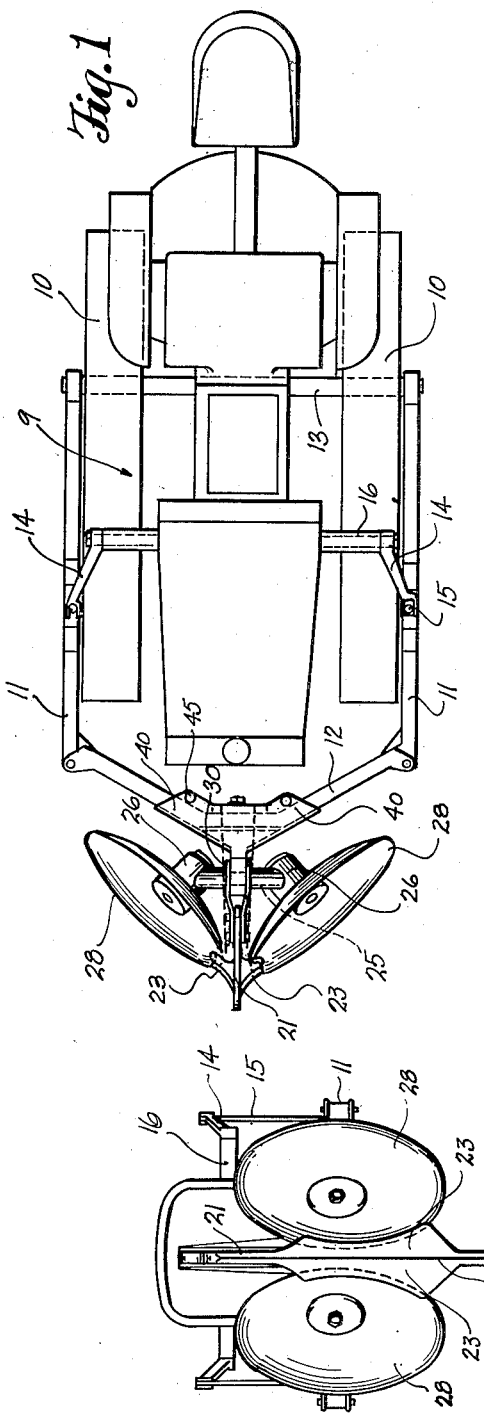
INVENTOR.
THEODORE P. FLYNN
BY
Cook & Robinson
ATTORNEYS Jan. 15, 1952
T. P. FLYNN
2,582,538
TRENCHING PLOW
Filed July 19, 1947
2 SHEETS—SHEET 2
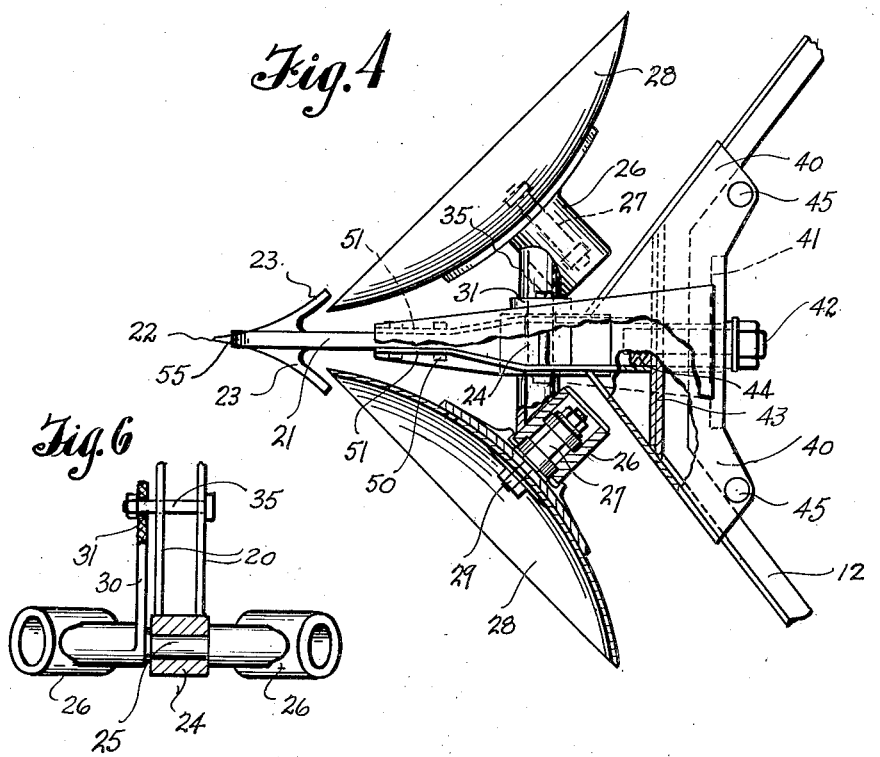
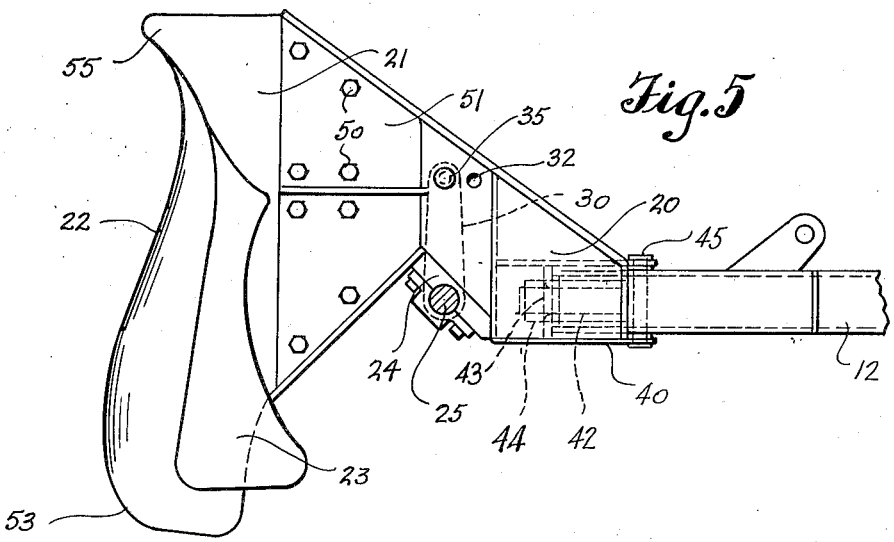
INVENTOR
THEODORE P. FLYNN
BY
Cook & Robinson
ATTORNEYS Patented Jan. 15, 1952

2,582,538

UNITED STATES PATENT OFFICE 2,582,538

TRENCHING PLOW

Theodore P. Flynn, Portland, Oreg., assignor to Isaacson Iron Works, Seattle, Wash.

Application July 19, 1947, Serial No. 762,119

6 Claims. (Cl. 97—53)

This invention relates to implements for trenching, ditching, plowing and similar operations, and it has reference more particularly to an implement that is known in trade as a "disc-dozer" and which is adapted to be functionally mounted, for its intended uses, upon the front end of any of the conventional types of bulldozer push frames after the fashion of mounting the usual bulldozer blade thereon; it being the principal object of the invention to provide a practical, serviceable and easily controlled tractor powered implement for the above stated purposes, comprising a novel arrangement of two freely rotatable disc plows used in combination with a center cutting coulter bar whereby, with the equipment properly mounted on the bulldozer frame, the tractor moving forwardly and the discs set in the ground, a two-way plowing operation will be effected for the formation of a trench or ditch, the depth of which may be regulated by and in accordance with the vertical adjustment of the bulldozer frame.

It is also an object of the present invention to provide a plowing, trenching or ditch forming implement of the character above stated that in use is disposed directly ahead of the supporting tractor and in full view from the tractor driver's position so that any obstacle in the line of advancement may be readily observed and avoided, if necessary, by lifting of the bulldozer frame. Furthermore, it is an object of the invention to provide the present implement with plows that will be retained at the working depth at which they may be set, by their weight as supplemented by the weight of the bulldozer frame and tractor, and which will be held against lifting from the ground that would make the ditching operation irregular.

Still another object of the invention is to provide a ditching, trenching and plowing implement in connection with the bulldozer push frame, and to provide that the working depth of the plows may be accurately determined by the setting of the bulldozer frame, and this working depth may be controlled and changed through the use of the control devices with which the tractor is equipped for the adjustment of the frame in bulldozing operations.

Still another object of the invention resides in the provision of a novel form of center coulter bar that coacts with the plow discs to facilitate the trenching and ditching operations and which also is designed to serve as a means for clearing brush, logs and debris from the path of advancement of the plows.

Yet another object of the invention resides in the provision of means whereby the angular setting of the plow discs relative to the ground may be changed and the position of adjustment secured.

Still further objects of the invention reside in the details of construction and in the combination of parts embodied in the invention, in the adjustment of parts, and mode of operation of the implement, as will hereinafter be fully described.

In accomplishing the above mentioned and other objects of the invention, I have provided the improved details of construction, the preferred forms of which are illustrated in the accompanying drawings, wherein —

Fig. 1 is a top or plan view of a tractor equipped with a trenching, ditching and plowing implement in accordance with and embodied by the present invention.

Fig. 2 is a side view of the same, with the near disc removed.

Fig. 3 is a front elevation of the implement, showing the relationship of the plow discs to the coulter bar.

Fig. 4 is an enlarged, plan view of the forward end portion of a bulldozer frame, showing it as equipped with the implement of the present invention; certain parts being broken away and others being shown in section for better understanding of construction.

Fig. 5 is a side view of the coulter bar and mounting bracket.

Fig. 6 is a detail of the plow tilting and securing means.

Briefly described, the present implement comprises a pair of cooperatively arranged disc plows, mounted on a support that is adapted to be rigidly fixed to the forward end of a bulldozer frame as applied in the usual manner to a tractor for bulldozing operations. The two plow discs are set at forty-five degree angles with respect to the longitudinal center line of the frame and tractor, at opposite sides thereof, with their leading edges even and quite close together and the discs concaved and facing forwardly and laterally in such manner as to turn furrows in opposite directions. Between the discs and forwardly thereof, is a center cutting coulter bar and brush remover: the bar is equipped with a vertical cutting edge and with laterally and rearwardly extending wings at opposite sides of the blade, that overlie the disc edges above the ground.

In the use of this implement in combination with the bulldozer frame, the usual equipment on the tractor is employed for raising and lowering the bulldozer frame to determine and control the working depth of the plows.

Referring more in detail to the drawings—

In Figs. 1 and 2, 9 designates, in its entirety, what may represent any one of the present day types of tractors that are suitable for the present purpose, it being shown that the tractor is equipped with crawler tracks 10—10 of the usual type of construction and with a bulldozer push frame as commonly used for the usual bulldozer operations. Such a push frame preferably comprises opposite side beams 11—11, extended along opposite sides of the tractor, outside of the crawler tracks and rigidly joined at their forward ends by means of a forwardly pointed A-frame structure designated by numeral 12.

The push beams 11—11 are pivotally mounted at their rear ends upon the opposite end portions of a cross shaft 13 that is fixed rigidly in the tractor frame for the operative support of the crawler tracks thereon as is a common practice.

The bulldozer frame, comprised by the beams 11—11 and the A-frame 12, and as used for the present purposes, is adapted to be raised or lowered at its forward end by the same devices associated with the tractor for the control of the frame in its bulldozing operations. I have shown the tractor to be equipped with frame lifting levers 14 at opposite sides, connected with the frame beams by links 15. The levers are fixed on the ends of a cross shaft 16 with which a power mechanism, not shown, is suitably associated to adjust the shaft. In lieu of the mechanism shown, other suitable lifting means might be applied to the tractor for this purpose.

Mounted by and at the vertex of the A-frame 12, in the central longitudinal plane of the tractor, is a vertically disposed and forwardly directed bracket for supporting the disc plows. This is designated in its entirety by numeral 20, and is rigidly bolted, or otherwise suitably fixed to the A-frame, and extends somewhat forwardly thereof as shown in Fig. 5. Mounted at the forward end of this bracket is a vertical coulter bar 21, formed with a vertical, center cutting blade 22 located in the central longitudinal plane of the bulldozer frame structure, and with opposite side wings, or flanges, 23—23 which extend rearwardly and laterally from the blade, as has been shown in Fig. 4, to overlie the leading edges of the plow discs along their normal working or cutting portions.

Fixed to the lower edge of the bracket member 20, just forward of the vertex of the A-frame 12, is a bearing 24 in which a short, horizontally disposed cross-shaft 25 is rotatably contained. Fixed rigidly to the opposite ends of this cross-shaft so as to be held in adjustment thereby, and closely adjacent the bearing 24, are bearings 26—26 wherein the supporting spindles 27—27 for the disc plows 28—28 are rotatably contained for the functional mounting of the discs, as seen in Fig. 4.

It will be understood by reference to Fig. 4 that the bearings 26—26 lie in the same plane and are axially at right angles to each other. The spindles 27—27 extend from the bearings and the discs are rigidly but removably secured thereon by nuts, as at 29. The discs, which are of equal diameter and substantially concaved, are symmetrically located at opposite sides of the central, longitudinal plane of the A-frame and the tractor, and are forwardly and laterally faced, with their leading edges close together and disposed back of the cutting edge of the coulter bar and protected by the flanges 23—23 that extend laterally from the bar. The cross shaft 25 which mounts the plow discs on the bracket, is rotatable in the bearing 24, and by a rotatable adjustment, the angle of the plow discs relative to the ground may be changed. To make this change in adjustment or setting and to retain the parts at a set position, I have fixed a short lever arm 30 to the shaft 25 closely adjacent one end of the bearing 24. This lever extends upwardly adjacent one side of the bracket member. At its upper end the lever has a hole 31, adapted by the swinging of the lever forwardly or rearwardly, to be registered selectively with holes 32 in the bracket 20 to receive a bolt as at 35 to retain the shaft 25 at any one of its different positions of rotatable adjustment and thereby to hold the disc plows at any of the different angular positions relative to the ground to which it may be adjusted to best adapt the device to the work being done.

It will be mentioned here that the bracket 20 whereby the plow discs are supported from the A-frame comprises, at its attaching end, laterally and oppositely directed wings 40—40, which are inclined rearwardly and receive the opposite, converging side members of the A-frame 12 as shown in Fig. 4. The wings are joined by a cross plate 41 and this plate is adapted to receive a bolt 42 therethrough, and which bolt may also be extended through an opening in the forward end piece 43 of the A-frame to receive a securing nut 44. Also, bolts 45—45 are extended vertically through the wings 40—40 as in Fig. 4, to add security to the mounting of the bracket.

It will be understood that with the discs mounted as described and set in the ground as for plowing, they will rotate as the tractor moves forward and each will throw a furrow of dirt to the corresponding side of the frame, and together they will form a trench, or ditch, the depth of which may be determined by the angle of the plows and by the depth of their setting, by the vertical adjustment of the bulldozer.

It is possible and it is anticipated also, that the plow discs may be used singly; this being desirable for some purposes. To accomplish this, it is only necessary that one of the discs be removed from its supporting spindle 27 by removal of its securing nut 29.

The design of the coulter bar or plate 21 and blade is of importance. It is shown in Fig. 4, that the bar comprises a flat, plate-like body portion, disposed vertically and secured by bolts 50 between side plates 51—51 of the mounting bracket. Along its forward edge, the bar is sharpened to provide the cutting edge. At its lower end the bar has a rounded nose portion 53 to prevent its hanging up on roots or stones. The blade will split the earth between the discs as the tractor advances and will cut or ride over roots and wedge itself between rocks that may be in the line of travel. The lower half of the blade is forwardly arched so that it forces roots downward and brush or logs upward, and extending from opposite sides of this arched portion are the wings or flanges 23—23 back of which the forward edges of the discs are located. At its upper end the coulter bar is formed with a forwardly extending nose portion 55 whereby logs are held against slipping upwardly from the bar and are caused to be pushed forward until the end of the log slips laterally from the bar. The angle of the flanges is such as to afford an easy and effective ground breaking action.

Such devices are especially useful for digging fire trenches; for digging ditches, for irrigation or other purposes; for cleaning trenches, for plowing and all similar operations. The provision for adjustment of the disc to different digging angles provides for wider or narrower ditches and more or less spreading of the dirt, which is of importance in fire fighting.

Such equipment may be made in large or small sizes and the mounting means made to adapt the equipment for use on bulldozer frames of various makes.

Having thus described my invention, what I claim as new therein, and desire to secure by Letters Patent, is:

1. A plowing implement comprising a mounting bracket, a vertically extending coulter bar mounted by the bracket and formed with a forward cutting edge, a bearing fixed to the bracket rearwardly of the coulter bar, a cross-shaft rotatably mounted in said bearing, bearings fixed on the opposite ends of said cross-shaft, spindles mounted in said latter bearings and extending forwardly in angular divergence, plow discs rotatably mounted by said spindles at their forward ends and cooperatively arranged to turn furrows in opposite directions from the coulter bar, and means fixed to the cross-shaft for rotatably adjusting the cross-shaft to change the plowing angle of the discs.

2. A plowing implement comprising a mounting bracket, a vertically disposed coulter bar rigidly fixed to the forward end of the bracket and formed with a forward cutting edge, a bearing fixed to the bracket rearwardly of the coulter bar, a cross shaft mounted in said bearing, bearings fixed on the ends of said shaft, spindles mounted in said latter bearings and extended forwardly in angular divergence and plow discs rotatably mounted by said spindles and cooperatively arranged to turn furrows in opposite directions from the coulter bar, said cross shaft being rotatably secured in its mounting bearing and having a lever fixed thereto and whereby it may be rotatably adjusted and means for securing the lever to the bracket at its different positions of adjustment.

3. A plowing implement comprising a mounting bracket, a vertically extending coulter bar mounted rigidly by said bracket forwardly thereof and formed with a forward cutting edge, a pair of disc plows rotatably mounted at opposite sides of the coulter bar for the turning of furrows laterally therefrom in opposite directions; said coulter bar having its cutting edge forwardly arched along the lower portion of the bar to effect an upward and downward deflection of roots, and having a rearwardly and downwardly rounded lower end portion.

4. A plowing implement comprising a rigid mounting bracket for the implement, a vertically extending coulter bar mounted rigidly by said bracket forwardly thereof and formed with a forward cutting edge, a pair of disc plows supported by the bracket at opposite sides of the coulter bar for the turning of furrows laterally therefrom in opposite directions, the cutting edge of said coulter bar being forwardly arched along the lower portion of the bar and terminating at its lower end in a rearwardly rounded nose, and the bar being formed at its upper end with a forwardly projecting nose.

5. A plowing implement of the character described comprising a bracket equipped for rigid mounting on a support, to extend forwardly therefrom, a vertically disposed coulter bar fixed to the forward end of the bracket, and formed with sharpened forward edge, a bearing fixed to the bracket rearwardly of said coulter bar, a cross shaft in said bearing, disc plows rotatably supported from the cross shaft at opposite sides of the coulter for turning furrows of earth in opposite directions and earth deflecting wings extending laterally from opposite sides of the bar to protectively overlie the forward edge portions of the discs; said coulter bar having its cutting edge arched forwardly along the lower portion, and merging at its lower end into a rearwardly rounded runner, and having its upper end terminating in a forwardly projecting nose.

6. A plowing implement of the character described comprising a bracket equipped for rigid securement to a support to extend forwardly thereof, a vertically disposed coulter bar fixed to the forward end of the bracket and formed with a sharpened forward edge and with laterally and rearwardly extending earth deflecting wings at opposite sides, a bearing fixed to the bracket rearward of the coulter, a cross shaft in said bearing, bearings fixed in opposite ends of the cross shaft, spindles revoluble in said latter bearings and extending forwardly therefrom in equal angular divergence from the center line of the implement, plow discs revolubly supported in the spindles to turn furrows in opposite directions; said discs having their forward edges protected by said wings of the coulter bar, and a lever fixed to said cross shaft to effect rotative adjustment thereof to change the angle of the plow discs, and means for locking the lever to the bracket at its various positions of adjustment; said coulter bar having a rearwardly rounded lower end portion extending below the level of the lower ends of said wings and a forwardly projecting nose at its upper end.

THEODORE P. FLYNN.

REFERENCES CITED

The following references are of record in the file of this patent:

UNITED STATES PATENTS

| Number | Name | Date |
| --- | --- | --- |
| 553,510 | Campbell | Jan. 28, 1896 |
| 1,084,307 | Altgelt | Jan. 13, 1914 |
| 1,613,648 | Delaurier | Jan. 11, 1927 |
| 2,358,495 | Pace | Sept. 19, 1944 |
| 2,414,994 | Wright | Jan. 28, 1947 |